United States Patent [19]

Sugisaki et al.

[11] Patent Number: 5,535,275
[45] Date of Patent: Jul. 9, 1996

[54] APPARATUS AND METHOD FOR PRODUCING SCRAMBLED DIGITAL VIDEO SIGNALS

[75] Inventors: Kiminori Sugisaki; Keiji Kanota, both of Kanagawa, Japan

[73] Assignee: Sony Corporation, Tokyo, Japan

[21] Appl. No.: 263,423

[22] Filed: Jun. 21, 1994

[30] Foreign Application Priority Data

Jul. 8, 1993 [JP] Japan ..................... 5-193218

[51] Int. Cl.$^6$ .............. H04N 7/167; H04L 9/34
[52] U.S. Cl. ............... 380/10; 380/20; 380/36; 380/49
[58] Field of Search ............. 380/14, 10, 36, 380/49, 50, 20

[56] References Cited

U.S. PATENT DOCUMENTS

| | | | |
|---|---|---|---|
| 5,208,857 | 5/1993 | Lebrat | 380/14 |
| 5,216,712 | 6/1993 | Shimoda et al. | 380/4 |
| 5,377,266 | 12/1994 | Katta et al. | 380/20 |
| 5,384,849 | 1/1995 | Jeong | 380/49 |

FOREIGN PATENT DOCUMENTS 0454556  10/1991  France .
2067871  7/1981  United Kingdom .

Primary Examiner—Gilberto Barrón, Jr.
Attorney, Agent, or Firm—William S. Frommer; Alvin Sinderbrand

[57] ABSTRACT

Unauthorized copying of a video signal is prevented by means of a compression encoding circuit that selectively applies scrambling to the encoded signal. The compression encoding circuit is of the type which divides frames of a digital video signal into rectangular data blocks, aggregates a predetermined number of data blocks to form macroblocks, shuffles the macroblocks within the video frame, and performs discrete cosine transform processing block-by-block on the rectangular data blocks making up the shuffled macroblocks. The scrambling may be accomplished by rearranging the order of the rectangular data blocks within each macroblock, or by changing the pattern according to which macroblocks are shuffled in the video frames. The scrambling may also be accomplished by interchanging bits in a component, such as the DC component, of the DCT-processed data, or by setting such data bits to predetermined values. A compression encoding circuit with the above-described scrambling capability may be used in a digital video tape recorder (VTR), and the scrambling capability may be activated in response to a copyright protection signal present in an analog video signal supplied as an input to the digital VTR.

19 Claims, 12 Drawing Sheets

FIG. I

ORDINARY DATA | Y1 | Y2 | CR | Y3 | Y4 | CB |

SCRAMBLE ↓    (DESCRAMBLE) ↑

SCRAMBLED DATA | Y2 | Y1 | CR | Y4 | Y3 | CB |

FIG. 2

READING IN ORDINARY CASE
(F → B → D → A → E)

| f i-j |
| b i-j |
| d i-j |
| a i-j |
| e i-j |

SCRAMBLE →
← (DESCRAMBLE)

SCRAMBLED
(B → D → A → E → F)

| b i-j |
| d i-j |
| a i-j |
| e i-j |
| f i-j |

FIG. 3
ORDINARY SCREEN 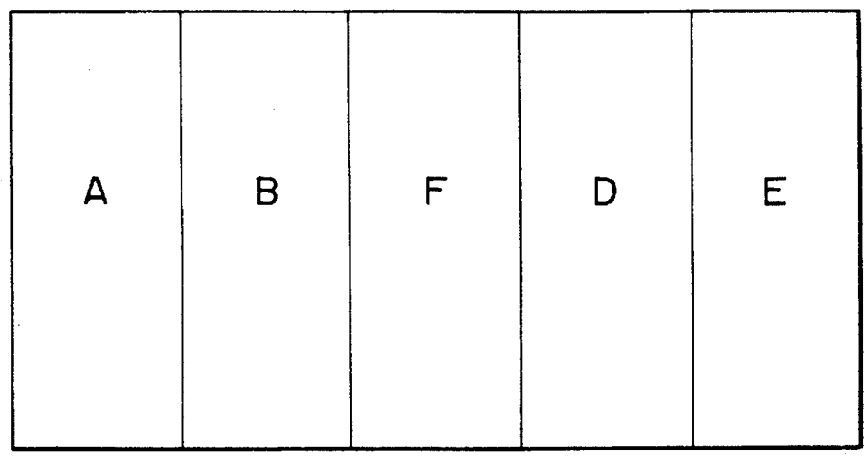
SCRAMBLE
SCRAMBLED SCREEN 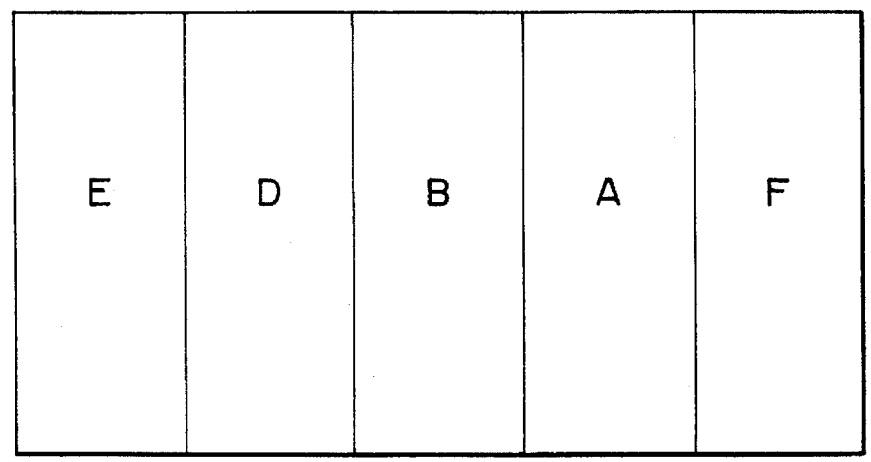

FIG. 4A (ORDINARY READING ORDER)

f1-1, ......, e1-27, f2-1, ......, e2-27, ......, f10-1, ......, e10-27

↓ SCRAMBLE (READING ORDER OF SCRAMBLED DATA)

| A1 | B5 | F9 | D3 | E7 |
|----|----|----|----|----|
| A2 | B6 | F10| D4 | E8 |
| A3 | B7 | F1 | D5 | E9 |
| A4 | B8 | F2 | D6 | E10|
| A5 | B9 | F3 | D7 | E1 |
| A6 | B10| F4 | D8 | E2 |
| A7 | B1 | F5 | D9 | E3 |
| A8 | B2 | F6 | D10| E4 |
| A9 | B3 | F7 | D1 | E5 |
| A10| B4 | F8 | D2 | E6 |

ORDINARY SCREEN

→ SCRAMBLE

| A6 | B10| F4 | D8 | E2 |
|----|----|----|----|----|
| A7 | B1 | F5 | D9 | E3 |
| A8 | B2 | F6 | D10| E4 |
| A9 | B3 | F7 | D1 | E5 |
| A10| B4 | F8 | D2 | E6 |
| A1 | B5 | F9 | D3 | E7 |
| A2 | B6 | F10| D4 | E8 |
| A3 | B7 | F1 | D5 | E9 |
| A4 | B8 | F2 | D6 | E10|
| A5 | B9 | F3 | D7 | E1 |

SCRAMBLED SCREEN

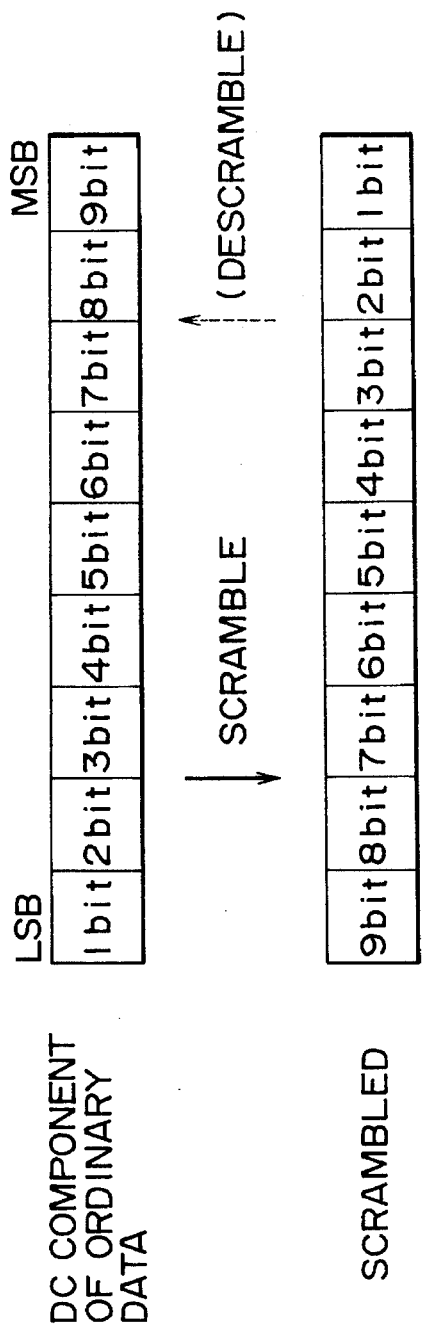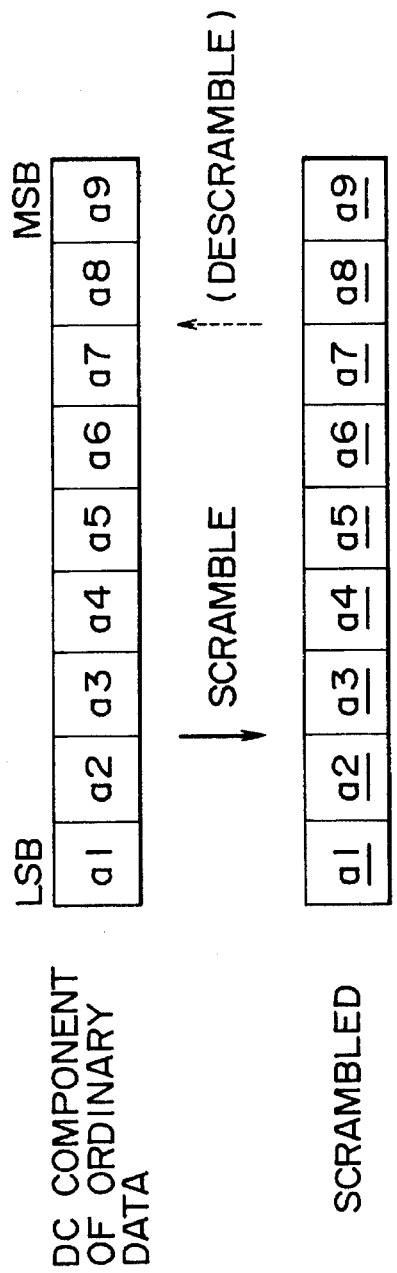

FIG. 13

| | A | B | F | D | E |
|---|---|---|---|---|---|
| 1 | A1 [a1-27] | B5 | F9 | D3 | E7 |
| 2 | A2 | B6 | F10 | D4 | E8 |
| 3 | A3 | B7 [f1-1] | F1 [f1-27] | D5 | E9 |
| 4 | A4 | B8 | F2 | D6 | E10 |
| 5 | A5 | B9 | F3 | D7 | E1 [e1-27] |
| 6 | A6 | B10 | F4 | D8 | E2 |
| 7 | A7 [b1-1] | B1 [b1-27] | F5 | D9 | E3 |
| 8 | A8 | B2 | F6 | D10 | E4 |
| 9 | A9 | B3 | F7 | D1 [d1-27] | E5 |
| 10 | A10 [a1-1] | B4 | F8 | D2 | E6 |

SUPER BLOCK (FOR 27 MACRO BLOCKS)    ▭ : MACRO BLOCK (READING ORDER)    (F → B → D → A → E)

f1-1, b1-1, d1-1, a1-1, e1-1, f1-2, b1-2, d1-2, a1-2, e1-2, ·········, f1-27, b1-27, d1-27, a1-27, e1-27, f2-1, b2-1, d2-1, a2-1, e2-1, ·········, ·········, f10-27, b10-27, d10-27, a10-27, e10-27

ORDER OF READING : DC, AC1, AC2, AC3, ----------, AC63

APPARATUS AND METHOD FOR PRODUCING SCRAMBLED DIGITAL VIDEO SIGNALS

BACKGROUND OF THE INVENTION

This invention relates to a technique for preventing unauthorized copying of an analog television signal by a digital video tape recorder (VTR), and more particularly to such a technique in which a scrambled signal is recorded when copying of an analog input signal is not authorized.

There has been proposed a VTR for consumer use in which program information in the form of a video signal and an associated audio signal are recorded in digital form on a magnetic tape. Digital recording of video signals and associated audio signals makes it possible for such program information to be reproduced and copied (or "dubbed") onto another tape with little or no deterioration in the quality of the signal reproduced from the copy tape. There are times, however, when it is desirable to prevent such signals from being recorded. For example, in order to protect the rights of those holding a copyright in the recorded material, copyright protection schemes have been proposed in which the digital recording format includes copyright protection information recorded in auxiliary information recording areas on the same magnetic tape with the program information. Such proposed copy protection systems are designed to prevent unauthorized copying of a signal that is transmitted in digital form from one digital VTR to another. In particular, when a digital signal reproduced from the magnetic tape is supplied as an input signal for recording to a VTR, the operation of the recording circuitry in the digital VTR is either permitted or inhibited in accordance with the copy protection information that is included in the input digital video signal. Thus, if the information indicates that the program information is not available for copying, the recording circuitry is controlled either to completely prevent any recording, or so that a scrambled video signal is recorded on the tape.

A similar copyright protection system relating to digital audio tape recordings is disclosed, for example, in U.S. Pat. Nos. 5,057,947 and 5,185,792, in which it has been proposed to provide within the copyright protection information a bit which indicates the "generation" of the tape on which digital audio data has been recorded. For example, the "generation" bit, may indicate either that the tape is an "original" recording, or that it is a copy of an original recording.

With respect to digital VTRs that can provide analog video and audio output and can receive analog video and audio signals as input signals, transmission of the video and audio signals in analog form from one digital VTR to another permits the receiving VTR to record a very high quality signal in digital form. The previously proposed copy protection systems for digital VTRs are, for the most part, directed to prevention of copying of a digital input signal, and therefore are not effective to prevent a digital VTR from recording a signal received in analog form, and the high quality of the resulting copies makes such copies a significant threat to the interests of those owning rights in the program information, such as copyright holders.

Moreover, there are a number of other sources of protectable program information in the form of video signals besides analog or digital video outputs from digital VTRs. Among these are television program signals broadcast from conventional terrestrial stations, television programs broadcast from satellites, video signals output from video disc players, television programming distributed by cable, and pay-per-view programming distributed by satellite or by cable. In some cases the broadcast signal may be free of any copyright but in other cases copyright is asserted. It is desirable that copying of the signals be prevented when a copyright is asserted with respect to the material represented by the signal or when the owner of such program information wishes to prevent unauthorized copying thereof.

Reference is made to co-pending patent applications Ser. Nos. 08/220,049, filed Mar. 30, 1994 and 08/094,433, filed Jul. 21, 1993, each of which has a common inventor and a common assignee with this application, and in which further details of video signal copyright protection systems are disclosed.

OBJECTS AND SUMMARY OF THE INVENTION

Accordingly, it is an object of the present invention to provide a method and apparatus for preventing a digital VTR from recording copy-protected video signals which are received in analog form from a digital VTR or another source of video signals.

Another object is to provide a copy protection method and apparatus in which copy protected signals are recorded in scrambled form by a digital VTR.

A further object of this invention is to provide a compression encoding circuit in a digital VTR which selectively outputs a scrambled compression-encoded signal in response to copy protection information present in an input signal to the digital VTR.

In accordance with an aspect of the present invention, there is provided a video signal scrambling apparatus that includes a compression encoding circuit that divides each frame of a digital video signal into rectangular blocks of data, forms macroblocks from the rectangular blocks of data by aggregating a predetermined number of the blocks of data to form each of the macroblocks, shuffles positions of the macroblocks within the frame of the digital video signal, and performs discrete cosine transform (DCT) processing block-by-block on the rectangular blocks of data making up the shuffled macroblocks. This compression-encoding circuit scrambles the digital video signal by arranging the rectangular blocks of data making up each macroblock at positions within the macroblock that are different from standard positions for the rectangular blocks of data.

According to another aspect of the present invention, the compression-encoding circuit scrambles the digital video signal by using a pattern for shuffling the macroblocks within each frame that is different from a standard pattern for shuffling the macroblocks.

According to still another aspect of the invention, the compression-encoding circuit scrambles the digital video signal by interchanging at least some bits of a particular component of the DCT processed data.

According to yet another aspect of the invention, the compression-encoding circuit scrambles the digital video signal by setting to a predetermined value at least some bits of a particular component of the DCT processed data.

The above-described circuitry in accordance with the present invention causes a scrambled digital video signal to be recorded when copying of the input signal is not permitted, so that reproduction of the resulting tape does not provide a satisfactory video signal, thereby providing copyright protection for video signals received in analog form by a digital VTR from another digital VTR or from other sources of analog video signals.

The above, and other objects, features and advantages of the present invention will be apparent from the following detailed description thereof which is to be read in connection with the accompanying drawings.

BRIEF DESCRIPTION OF THE DRAWINGS

FIG. 1 is a schematic illustration of a method of scrambling a video signal in accordance with the invention by rearranging DCT blocks within a macroblock;

FIG. 2 is a schematic illustration of a method of scrambling a video signal in accordance with the invention by rearranging macroblocks within a buffering unit;

FIG. 3 is a schematic illustration of a screen display of a video signal scrambled according to the method illustrated in FIG. 2;

FIGS. 4A and 4B are respectively a schematic illustration of a method of scrambling a video signal by rearranging macroblocks within a video frame, and a screen display corresponding to the resulting scrambled video signal;

FIG. 5 is a schematic illustration of a method of scrambling a video signal in accordance with the present invention by interchanging bits in a DC component of DCT-processed video data;

FIG. 6 is a schematic illustration of a method of scrambling a video signal in accordance with the present invention by inverting the values of bits in a DC component of DCT-processed video data;

FIG. 13 schematically illustrates macroblock shuffling; and

DETAILED DESCRIPTION OF THE PREFERRED EMBODIMENTS

Embodiments of the present invention will now be described.

In order to provide copy protection with respect to dubbing of an analog signal using digital VTRs, a system is provided in which an analog signal transmitted to a digital VTR by which recording is to be performed includes a signal representative of auxiliary information previously recorded on the tape to be dubbed, and the resulting signal included in the analog input to the recording VTR is used to control recording operations of that VTR. Therefore, in the VTR which is reproducing the tape to be dubbed, an ID signal representative of information regarding whether or not copying is permitted is generated and inserted into a predetermined line within a vertical blanking period of the analog video signal, and the analog video signal having the ID signal included therein is then transmitted to the recording VTR.

Figure 9A:
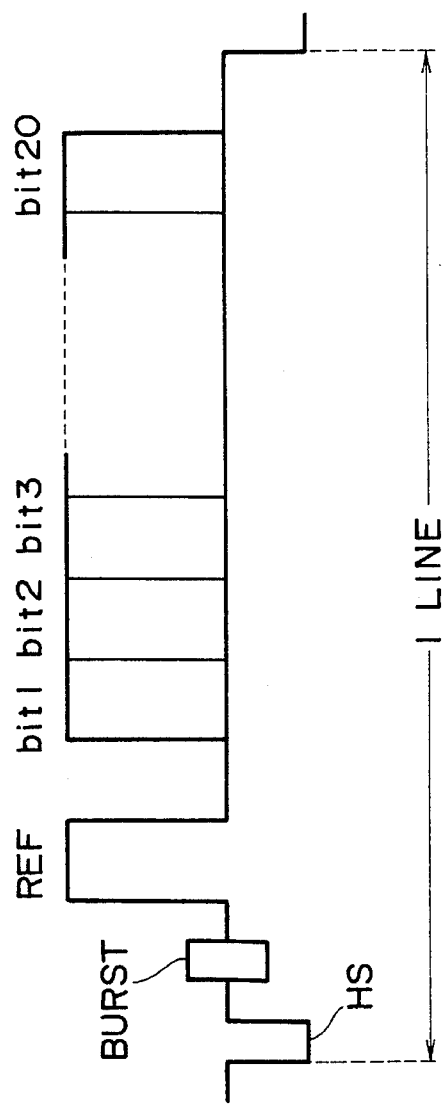
FIG. 9A is a waveform diagram which shows the format of an ID signal included in an analog video signal as part of a copy protection system.

The ID signal referred to above will now be described in more detail with reference to FIGS. 9A and 9B. FIG. 9A shows a horizontal line signal that is part of the vertical blanking interval of an analog video signal in which the ID signal has been inserted. The horizontal line signal shown in FIG. 9A includes a reference bit near the beginning of the line, followed by bits 1 through 20 which make up the ID signal.

Figure 9B:
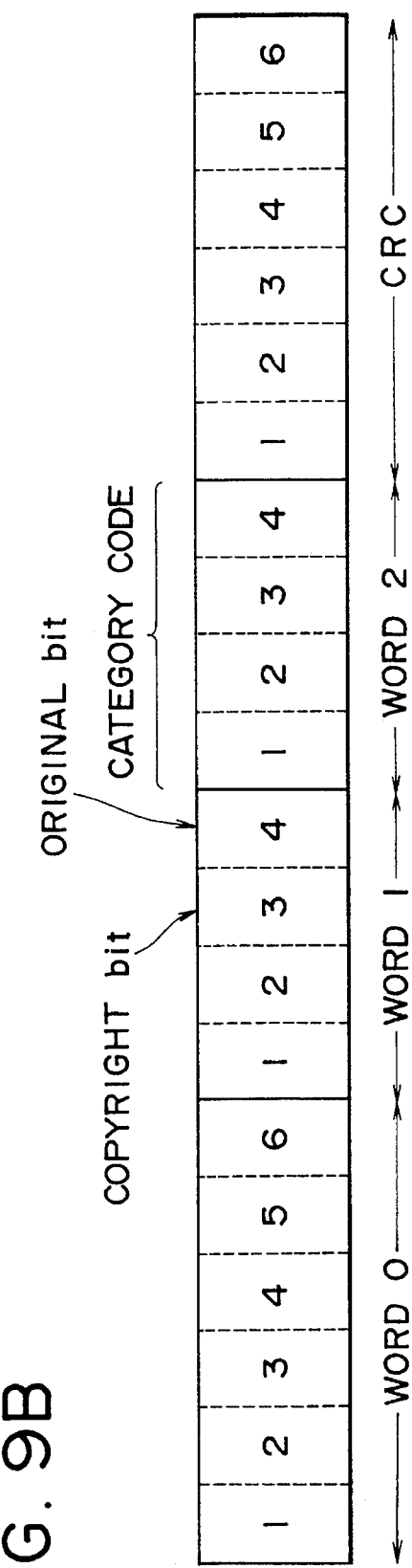
FIG. 9B shows additional details of the ID signal format of FIG. 9A.

Referring now to FIG. 9B, the 20 bits making up the ID signal include a word 0 consisting of 6 bits, a word 1 consisting of 4 bits, a word 2 consisting of 4 bits, and a cyclic redundancy code (CRC) consisting of 6 bits. The bits making up word 0 contain fundamental parameter and identification information with respect to a transmission format for the video signal. One of the bits of word 1 indicates whether or not copy protection is asserted with respect to the recorded material (e.g., whether the material is protected by copyright) and another bit is included in word 1 to indicate whether the recording is an original recording or a copy. For example, the third bit of word 1 may be the bit relating to copy protection, with the value "0" indicating that copying is to be prevented and the value "1" indicating that copy protection is not asserted. Similarly, the fourth bit of word 1 may be used for indicating whether the recording is original. For example, if the fourth bit of word 1 has the value "1" this may signify that the material is being reproduced from a commercially published tape, while the value "0" would indicate otherwise.

The four bits of word 2 comprise a category code which identifies the type of device from which the video signal is being transmitted. For instance, the code may indicate that the source of the video signal is a video tape recorder, a video disc, a satellite broadcasting system, a terrestrial broadcasting system, a digital television broadcast system, and so forth.

Figure 10:
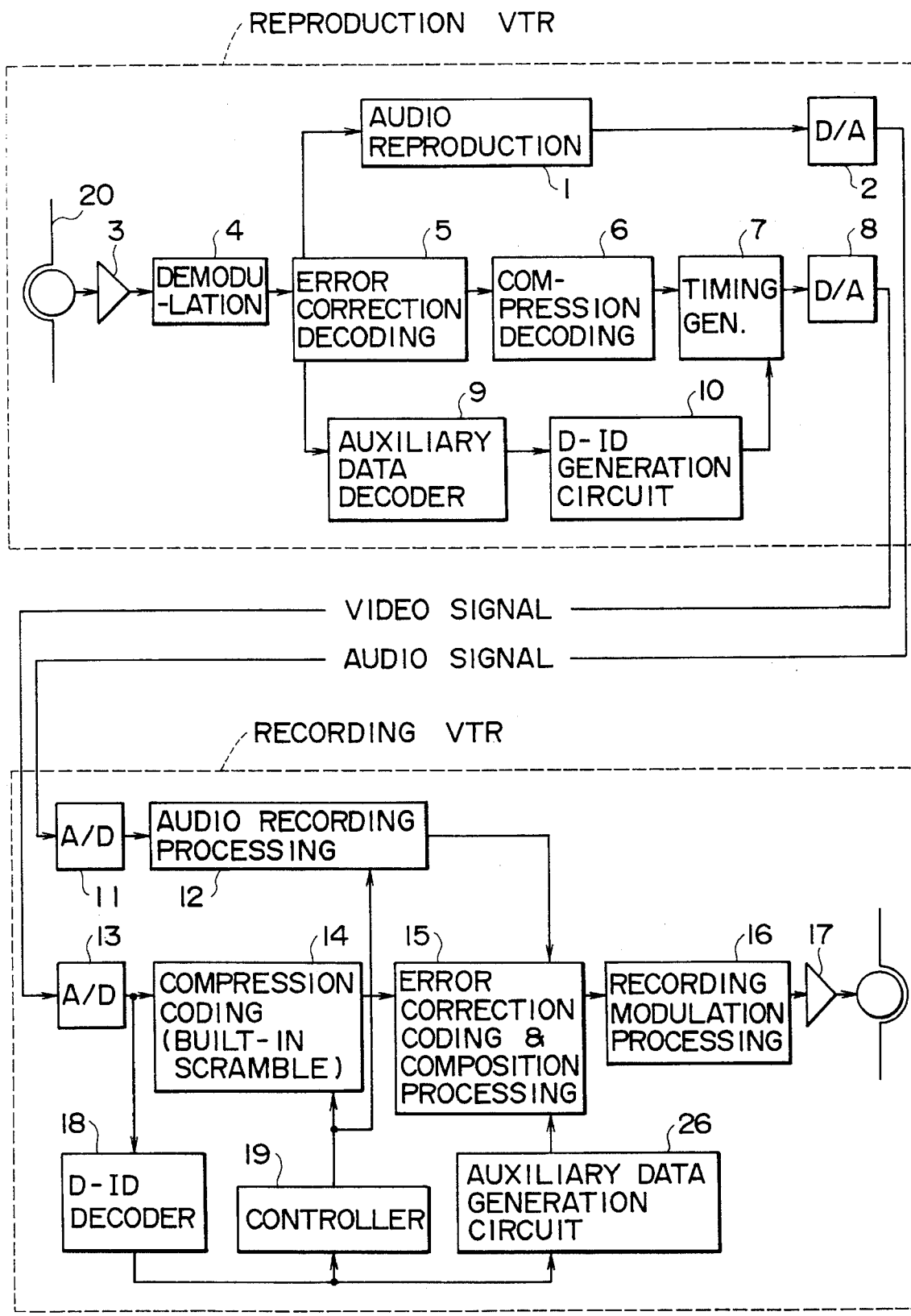
FIG. 10 is a block diagram of a reproducing section and a recording section of respective digital VTRs, in which the present invention is applied, and which are connected for dubbing of an analog video signal output from the reproducing section.

Referring initially to FIG. 10, there will be described embodiments of the present invention in which the ID signal of FIGS. 9A and 9B is used.

HARDWARE ENVIRONMENT

FIG. 10 illustrates in block diagram form a connection for analog dubbing between the reproduction section of one digital VTR and the recording section of a second digital VTR. In FIG. 10, an upper dotted line block represents the reproduction section of a first digital VTR which is the source of a signal to be dubbed, and a lower dotted line block represents the recording section of a second digital VTR in which the dubbing is to be performed. It will be noted that analog audio and video terminals of the first VTR are respectively connected to analog audio and video input terminals of the second VTR with digital-to-analog converters 2 and 8 of the first VTR respectively being the sources of the output audio and video signals, and those signals, when received as input signals at the second VTR, being supplied respectively to analog-to-digital converters 11 and 13 in the second VTR.

It should also be understood that a component digital signal is recorded in a compressed condition on a magnetic tape 20 that is reproduced by the first VTR, and that auxiliary data as previously described is also recorded on the magnetic tape 20 with the component digital video signal.

In the first VTR, data is reproduced from the tape by a magnetic head (not separately shown) and supplied from the magnetic head to an error correction decoding circuit 5 by way of a reproduction amplifier 3 and a demodulation circuit 4. After error correction has been performed on the reproduced data by the error correction decoding circuit 5, audio data is supplied to an audio reproduction circuit 1 while video data is supplied to an image compression decoding circuit 6. The signal output from the audio reproduction circuit 1 is supplied to the previously mentioned D/A converter 2, and the analog audio signal also mentioned above is then output from the D/A converter 2.

At the same time, a reconstituted video data signal is output from the image compression decoding circuit 6, and is supplied to the D/A converter 8 after data corresponding to synchronizing signals and for the appropriate blanking periods, etc. is added to the video data at a timing generator 7. As a result, an analog video signal which includes appropriate blanking periods and synchronization signals is output from the D/A converter 8.

Further, the auxiliary data, as mentioned above, which was recorded on the magnetic tape 20 and reproduced therefrom, is supplied from the error correction decoding circuit 5 to an auxiliary data decoder 9, at which the copy protection information present in the auxiliary data is detected. For example, it is determined whether copyright is asserted with respect to the signal recorded on the magnetic tape 20 and reproduced therefrom in the first VTR, and also whether that signal is being reproduced from an original tape, and so forth. A signal reflecting the determination made by the auxiliary data decoder 9 is supplied to a D-ID signal generation circuit 10. The D-ID signal generation circuit 10 forms a signal (hereinafter referred to as a "D-ID signal") which corresponds to the ID signal described above with respect to FIGS. 9A and 9B, assuming that such a signal had been converted into digital form. The D-ID signal is then supplied from the circuit 10 to the timing generator 7 for insertion into the previously described position within a vertical blanking period of the video data signal supplied to the timing generation circuit 7 from the compression decoding circuit 6. As a result, the video data signal which has the D-ID signal inserted therein is converted to an analog signal by the D/A converter 8 and the resulting analog video signal is transmitted to the recording section of the second VTR.

It is to be understood that the data present in the D-ID signal generated by the D-ID signal generation circuit 10 is representative of whether or not copyright is asserted in correspondence with the determination signal output from the auxiliary data decoder 9, and similarly whether or not the magnetic tape 20 is an original tape, and so forth.

The analog audio signal output from the first VTR is received at an audio recording processing circuit 12 in the second VTR by way of the A/D converter 11, and recording processing is performed on the received audio signal. Meanwhile, the analog video signal output from the first VTR, including the ID signal, is converted into a digital signal at A/D converter 13 and then supplied to a compression coding circuit 14, which has a scramble circuit included therein, and the ID signal which is present in the received analog video signal is converted to digital form at the A/D converter 13, with the resulting D-ID signal being provided to a D-ID signal decoder 18. A signal resulting from decoding of the D-ID signal is then supplied from the D-ID signal decoder 18 to an auxiliary data generation circuit 26 and a controller 19. The auxiliary data generation circuit 26 generates new auxiliary data in accordance with the output signal from the decoder 18. The new auxiliary data has the same information regarding whether or not copyright is asserted as in the D-ID signal which is received at the decoder 18, and also has the same information with respect to a category code, but with respect to the original bit, the value "0" is provided, indicating that the signal is no longer of an "original" generation.

At the same time, when the signal output from the decoder 18 indicates that copying is not permitted, the controller 19 causes the scramble circuit in the compression coding circuit 14 to become operative, and the controller 19 also causes scrambling to be applied to the audio data in the audio recording processing circuit 12. As a result, if the analog video signal output from the first VTR is a signal for which copying is not permitted, then scrambled audio data and scrambled video data are recorded at the second VTR, along with the auxiliary data provided from the generation circuit 26, so that accurate copying is not performed in the second VTR. As an alternative, with regard to the audio signal, it is contemplated simply to interrupt transmission of the audio signal from the audio recording processing circuit 12 to a composition processing circuit 15, in response to a signal from the controller 19, when copying is not permitted.

On the other hand, when the signal output from the decoder 18 indicates that copying is permitted, the controller 19 does not cause scrambling to take place in the compression coding circuit 14 or in the audio recording processing circuit 12, so that video data and audio data are processed in a normal manner in those circuits and are then supplied to an error correction coding and composition processing circuit 15, and the new auxiliary data provided from the secondary data generation circuit 26 is also supplied to the circuit 15 for inclusion in a combined data signal formed at that circuit. The resulting combined data signal is then subjected to recording modulation processing at a recording modulation processing circuit 16 and is transmitted for recording on a second magnetic tape by way of a recording amplifier 17.

Although there has just been described a case involving analog dubbing from one digital VTR to another, the above described system relating to auxiliary data and an ID signal can also be effectively used with signal sources other than a digital VTR. For instance, copy protection information can be added in advance in the form of auxiliary data to a digital video signal output from a digital VTR or a broadcast digital television signal, etc., or such copy protection information can be added to analog television signals or a video signal recorded in analog form on a magnetic tape, in which case the copy protection information is in the form of the ID signal described with respect to FIGS. 9A and 9B, and when such a signal is provided as an analog input to a digital VTR, the same process is carried out as was just described with respect to FIG. 10.

Also, as an alternative to the arrangement shown in FIG. 10 in which the decoder 18 decodes a D-ID signal that is part of a digital signal output from A/D converter 13, it is contemplated to provide a decoder which decodes the analog ID signal present upstream from the A/D converter 13.

By providing a system in which copy protection information is transmitted in the form as described above, a digital VTR according to the present invention can decode the copy protection information which is either in the form of auxiliary data or an ID signal whether the input signal is digital or analog, and thus can systematically protect the copyright regardless of the source of a signal to be recorded or reproduced.

Figure 8:
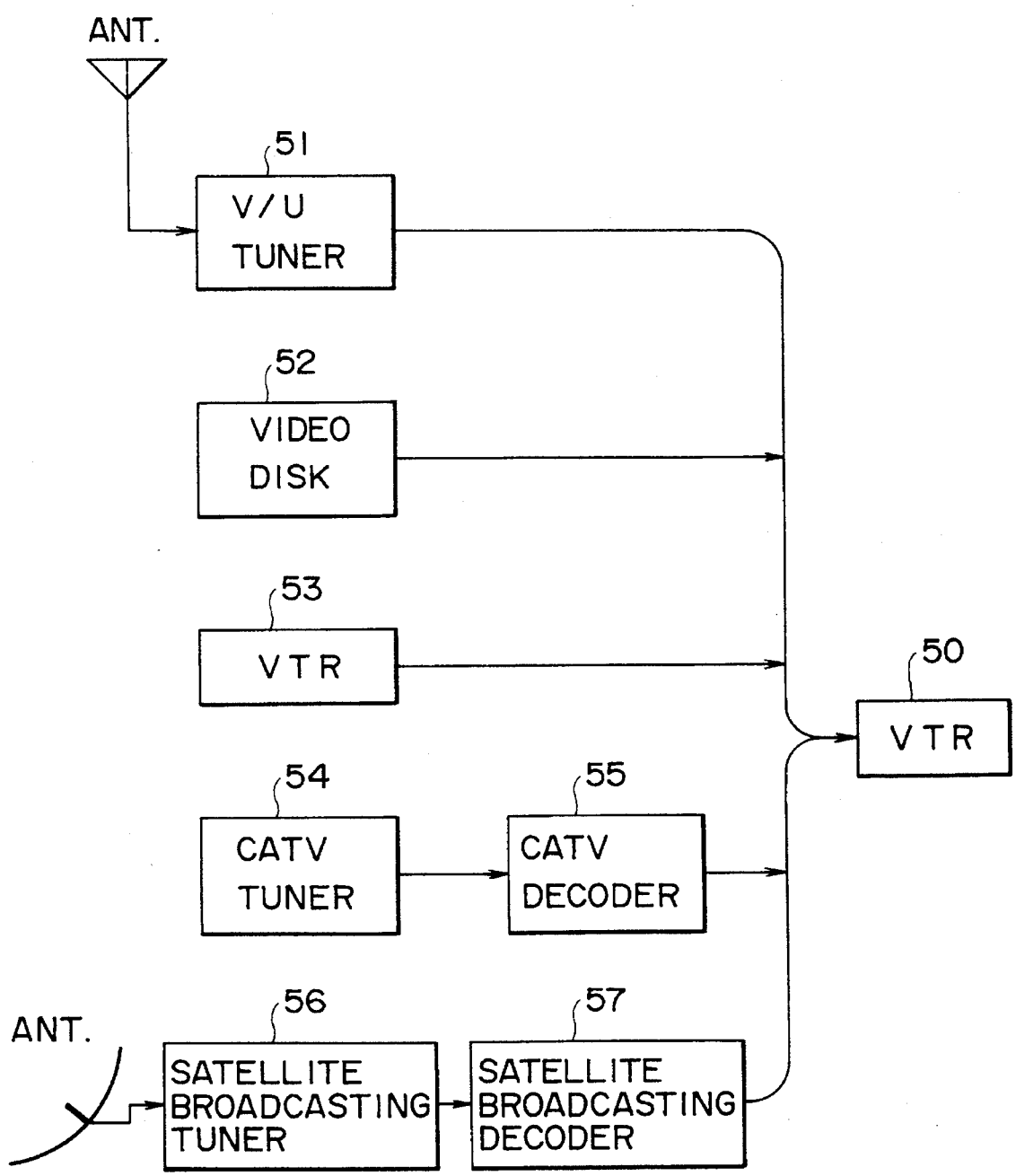
FIG. 8 is a block diagram of a video system in which the present invention may be applied.

FIG. 8 illustrates a video system in which a VTR 50, which corresponds to the second VTR of FIG. 10, is connected to receive video signals from several sources, including a conventional VHF/UHF tuner 51, a video disk player 52, and a VTR 53 which corresponds to the first VTR of FIG. 10. VTR 50 is also shown as being connected to receive signals from a cable T.V. tuner 54 by way of a cable T.V. decoder 55, and from a satellite broadcasting tuner 56 by way of a satellite broadcasting decoder 57.

The copy protection system described above is particularly useful in connection with pay-cable or pay-satellite broadcasting, in which case the copy protection information may be included in the broadcast signal. Alternatively, instead of including the copy protection information in the broadcast signal, the decoder 55 or 57 shown in FIG. 8, or some other component, may include the function of generating an ID signal and incorporating that signal in the received video signal so that a copyright protection bit in the ID signal may be set to inhibit recording in order to protect the broadcast signal.

It should also be noted that in a system in which copying is permitted with respect to a first generation tape, by detecting the state of an original bit to selectively control copying, it is also possible to use a number of different scrambling techniques, including greater or lesser degrees of scrambling, or to selectively use either a scrambling technique which allows for descrambling or a different kind of scrambling technique which does not permit descrambling, depending on the source of the video signal. This may be accomplished, for example, by using category code information included in the ID signal.

SCRAMBLING TECHNIQUES

At this point, scrambling techniques performed in accordance with the invention by the compression coding circuit 14 (FIG. 10) will be described, after initially describing the basic arrangement and operation of the compression coding circuit 14.

Compression Coding Circuit

Figure 11:
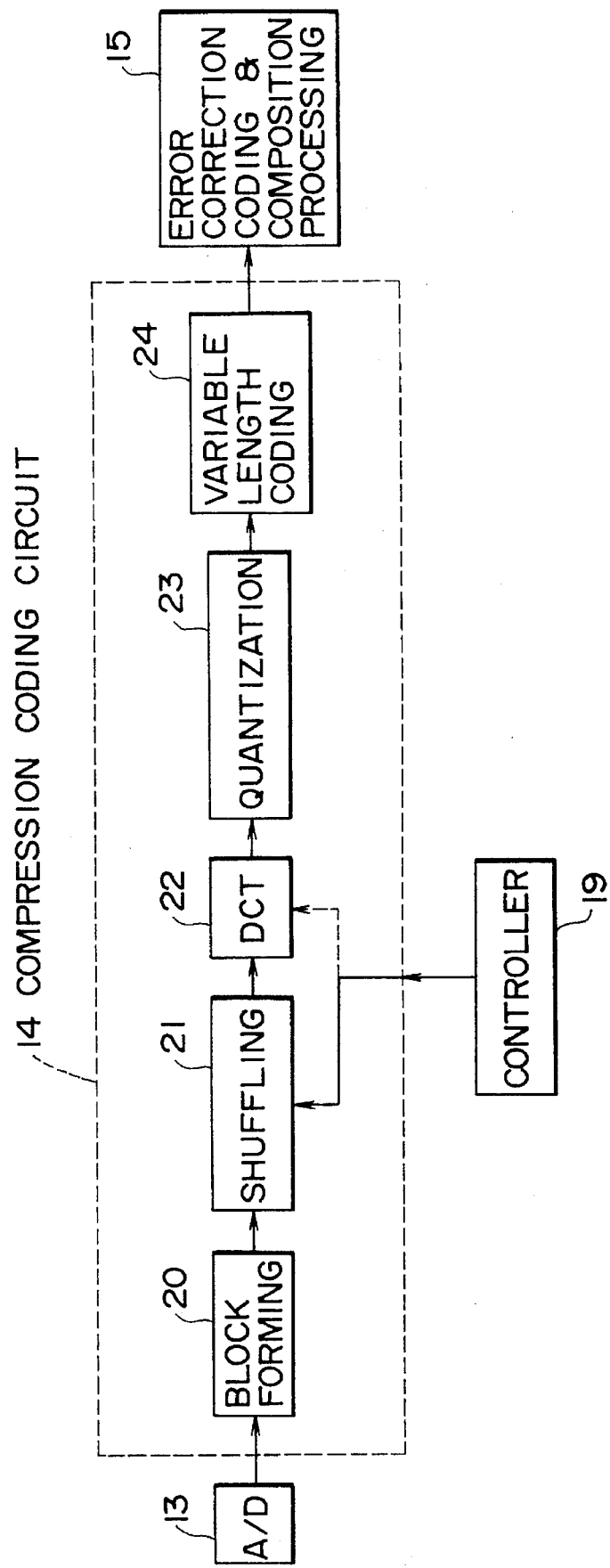
FIG. 11 is a block diagram of a compression coding circuit and associated circuits that are part of the recording section shown in FIG. 10.
Figure 12A:
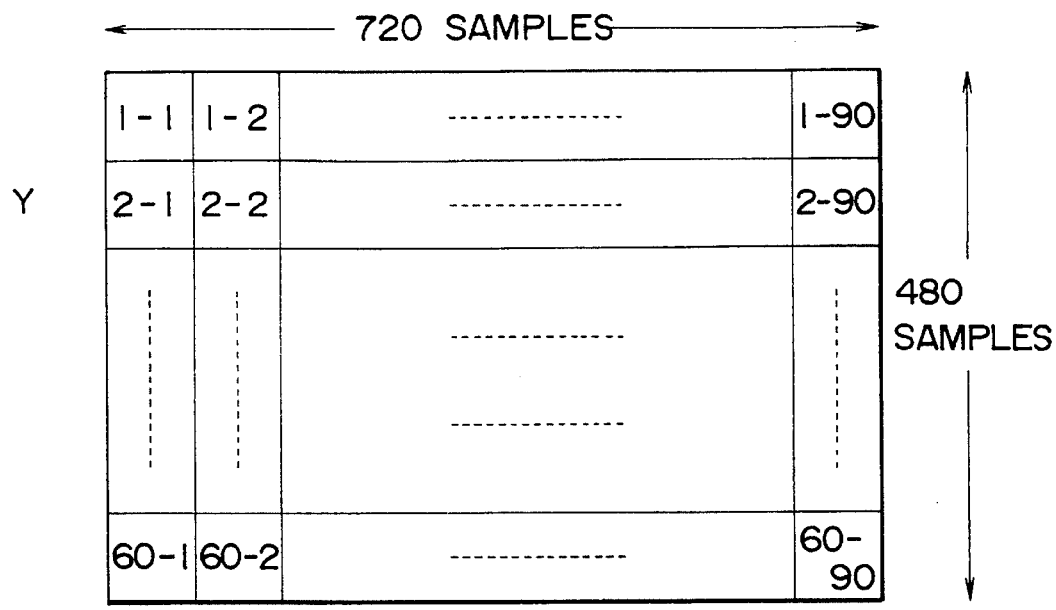
FIGS. 12A and 12B are respectively illustrations of the formation of DCT blocks from luminance and color difference signals, and FIG. 12C schematically illustrates formation of a macroblock from DCT blocks of luminance and color difference signals.
Figure 12B:
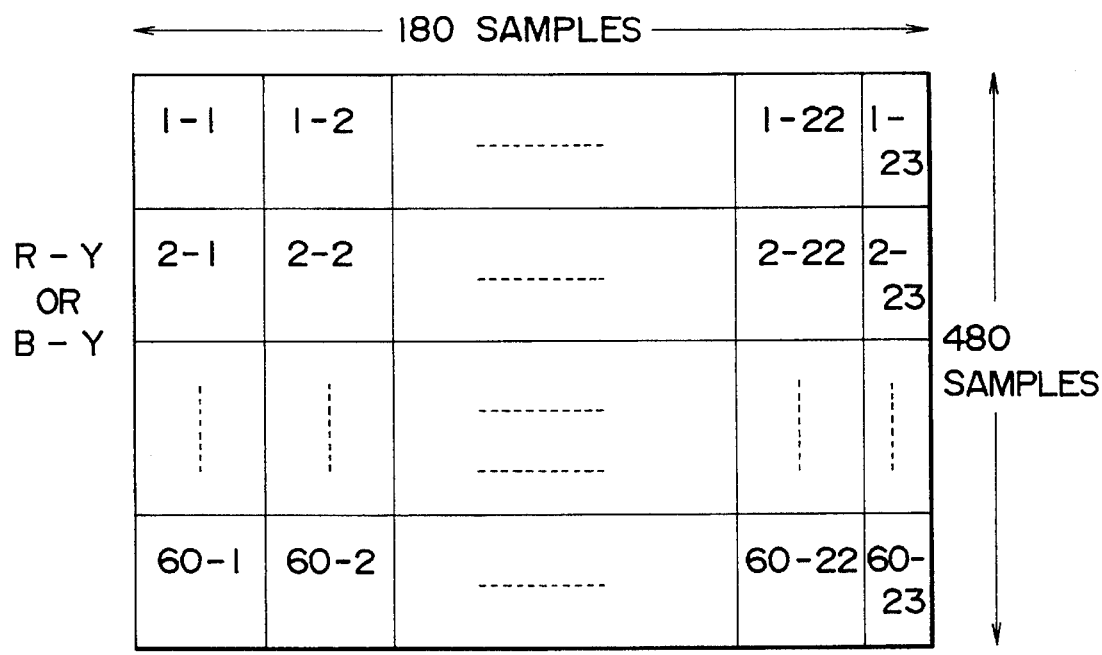

Referring to FIG. 11, there is shown a block diagram of the compression coding circuit 14, along with circuit elements in the second VTR of FIG. 10 which are associated with the compression coding circuit 14. As shown in FIG. 11, an input signal for the compression coding circuit 14 is provided by the analog-to-digital conversion circuit 13 and takes the form of a component video signal that includes Y, R-Y and B-Y signals formed at a conventional sampling frequency ratio of 4:1:1. This input signal is provided to a block forming circuit 20 which forms the input signal into rectangular blocks for subsequent DCT (discrete cosine transform) processing. In particular, the Y signal is formed at a sampling frequency of 13.5 Mhz and the B-Y and R-Y signals are each formed at 3.375 Mhz, and each frame of the video signal is made up of 720 samples of the Y signal in the horizontal direction and 480 samples in the vertical direction as shown in FIG. 12A, while each frame also includes, for each of the B-Y and R-Y signals, 180 samples in the horizontal direction and 480 samples in the vertical direction as shown in FIG. 12B. The rectangular blocks formed with respect to these signals in the block forming circuit 12 consist of 8 samples in the horizontal direction and 8 samples in the vertical direction, and these 8×8 blocks will sometimes be referred to as "DCT blocks".

As a result, for the Y signal, 90 DCT blocks are formed in the horizontal direction and 60 DCT blocks are formed in the vertical direction, so that a total of 5,400 DCT blocks are formed with respect to each frame of the Y signal. At the same time, for each of the B-Y and the R-Y signals, 22.5 DCT blocks are formed in the horizontal direction and 60 DCT blocks are formed in the vertical direction, so that a total of 1,350 DCT blocks are formed in each frame for each type of color difference signal.

Figure 12C:
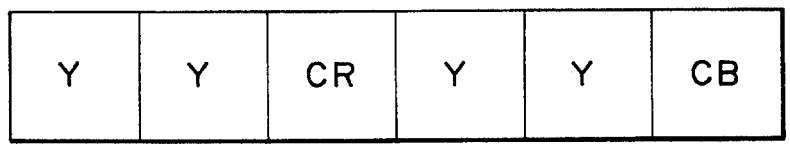

The blocks of signals formed in this manner are then subjected to shuffling in a shuffling circuit 21 that is immediately downstream from the block forming circuit 20. The shuffling is performed with respect to macroblocks, each of which is made up of 6 DCT blocks as shown in FIG. 12C. In particular, each macroblock is made up of 4 DCT blocks of the Y signal, 1 DCT block of the R-Y signal (indicated by the label "CR" in FIG. 12C), and 1 DCT block of the B-Y signal (indicated by the label "CB").

It is to be noted that all of the DCT blocks making up a given macroblock correspond to the same position within a frame. For example, DCT blocks which respectively correspond to the squares labeled 1-1, 1-2, 1-3 and 1-4 in FIG. 12A are used as the first, second, fourth and fifth blocks in a given macroblock, while the R-Y and B-Y blocks corresponding to the square labeled 1-1 in FIG. 12B are used as the third and sixth blocks of that macroblock. However, since only one-half of the data required for a macroblock is present at the right-hand end of each tier of blocks, the data needed for a right-most macroblock is formed from vertically adjacent blocks, as, for example, by aggregating the four Y blocks corresponding to the positions 1-89, 1-90, 2-89 and 2-90 in FIG. 12A, and the R-Y and B-Y half-blocks corresponding to the positions 1-23 and 2-23 in FIG. 12B.

As will be appreciated from the foregoing description, the video data making up an entire frame is formed into 1,350 macroblocks. A specific example of the manner in which the macroblocks are shuffled will now be described with reference to FIG. 13.

FIG. 13 schematically illustrates the macroblock data making up an entire screen (i.e., an entire frame), with the height and width of FIG. 13 corresponding respectively to the height and width of a screen display. The data is divided in a horizontal direction (i.e., by vertical dividing lines) into five equal areas A, B, F, D, and E, as shown in FIG. 13, and these areas are then, in turn, divided in the vertical direction (by horizontal dividing lines) into ten equal areas each, so as to form fifty sections labeled A1–A10, B1–B10, F1–F10, D1–D10, and E1–E10. Since, as mentioned before, the data for the entire screen consists of 1,350 macroblocks, each of the fifty sections is made up of twenty-seven macroblocks, and the sections will also sometimes be referred to as "super-blocks".

The twenty-seven macroblocks making up one section can be represented in the form i–j (with i=1, 2, ..., 10 and j=1, 2, ..., 27) following a lower case letter (a, b, f, d or e). For example, the first and the twenty-seventh macroblock of the sections A1, B1, F1, D1, and E1 are indicated in a simplified form in the respective sections in FIG. 13.

When the data for a frame is to be recorded on a magnetic tape, the macroblocks are read out for recording in the order indicated at the lower portion of FIG. 13 so that shuffling is accomplished. In particular, the macroblocks are read out in a cycle based on the five horizontal-direction divisions F, B, D, A, and E with one macroblock from each of those five divisions being read out in each cycle. For example, in the first cycle, the macroblocks f1-1, b1-1, d1-1, a1-1, and e1-1 are read out. Then, in the second cycle, the second macroblocks from each of the sections F1, B1, D1, A1, and E1 (that is, f1-2, b1-2, d1-2, a1-2, and e1-2) are read out, and the third macroblocks and so forth are read out in successive cycles until all twenty-seven of the macroblocks for each of the sections F1, B1, D1, A1, and E1 have been read out, at which time the reading out then proceeds in a similar manner for the sections F2, B2, D2, A2, and E2. After the last (twenty-seventh) macroblock has been read out from each of those sections, the reading-out operation continues through all the other sections until the twenty-seventh macroblock of each of the sections F10, B10, D10, A10, and E10 has been read out, at which time all of the data for the frame has been read out. The data comprised in the 30 DCT blocks formed from the five macroblocks read out in a particular cycle (i.e., one each from the areas F, B, D, A, and E) will sometimes be referred to as a "buffering unit".

Figure 14:
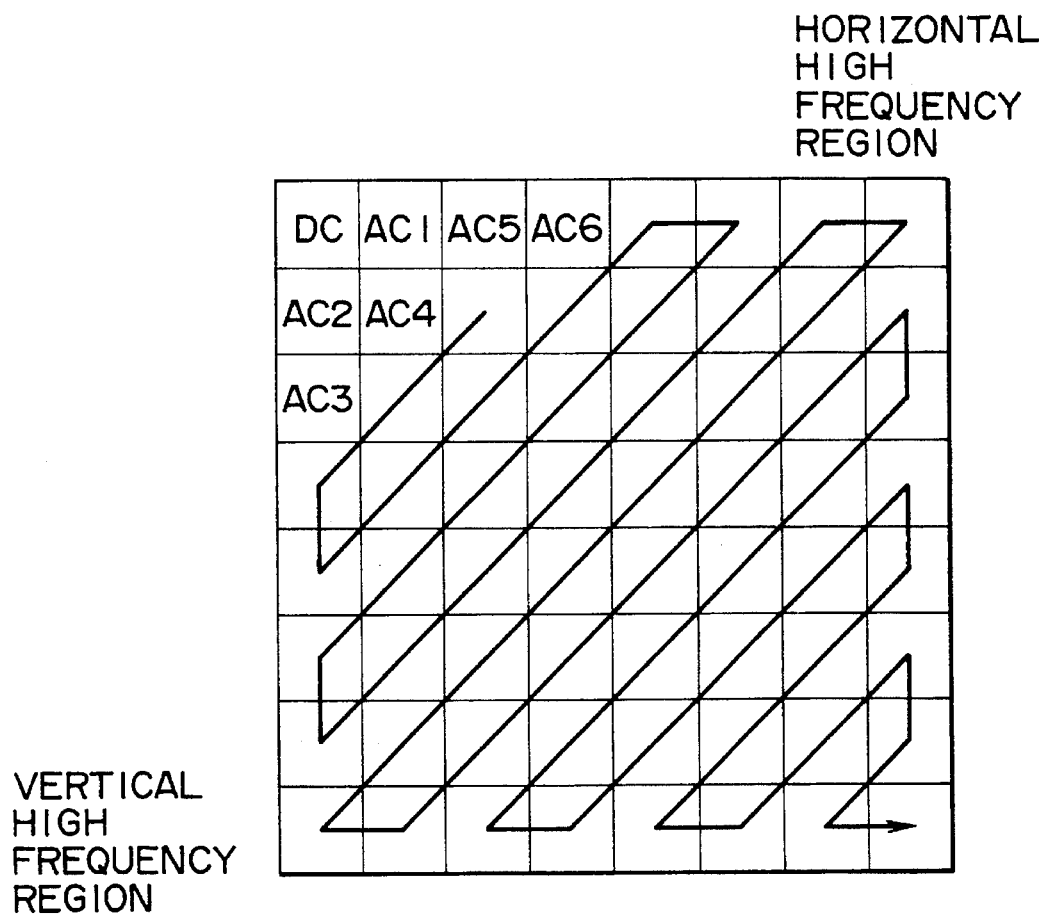
FIG. 14 schematically illustrates output scanning of a block of DCT-processed video data.

The data read out in a shuffled condition as described above is supplied from the shuffling circuit 21 to a DCT processing circuit 22 (FIG. 11) so that the data is subjected to DCT processing in which each DCT block is transformed into 64 DCT coefficients as shown in FIG. 14. The DCT coefficients are read out as with the DC component thereof first, followed by the AC components AC1, AC2, . . . , AC63 according to the zigzag read out pattern shown in FIG. 14. The read-out coefficients are supplied to a quantization circuit 23, which quantizes the coefficients, and then the quantized coefficients are supplied to a variable length coding circuit 24 at which variable length coding such as Huffman coding is performed.

It is to be noted that the quantization step used for quantizing the data in the quantization circuit 23 is set to a particular value for each buffering unit (each 30 DCT blocks) so that the total amount of data produced for the 30 DCT blocks upon variable length encoding will be less than a fixed value. In short, the amount of data output by the variable length coding circuit 24 for each buffering unit has a fixed length. The resulting fixed length data is then transmitted for recording on a magnetic tape by way of the error correction coding and composition processing circuit 15, the recording modulation processing circuit 16, and other circuitry downstream from the compression coding circuit 14.

Specific Examples of Scrambling Techniques

Specific examples of scrambling techniques carried out in the compression coding circuit of FIG. 11 in accordance with the invention will now be described with reference to FIGS. 1–7.

According to a first technique, illustrated in FIG. 1, the positions in which DCT blocks are arranged within each macroblock are changed to perform scrambling at the time when the macroblocks are read out from a memory (not shown) that is within the shuffling circuit 21 (FIG. 11). For example, as specifically shown in FIG. 1, the positions of the first and second macroblocks Y1 and Y2 are interchanged, and the positions of the fourth and fifth macroblocks Y3 and Y4 are interchanged, in order to perform scrambling. It should be recognized that, if a tape having the data recorded thereon in this scrambled condition is to be reproduced, it is possible to perform descrambling as indicated by the dotted line arrow in FIG. 1, to restore the data to its original unscrambled condition.

According to a second example, illustrated in FIGS. 2 and 3, the standard order in which macroblocks are read out for shuffling within each cycle is changed to a different order so that scrambling is carried out. According to this example, instead of reading out the macroblocks in the order of the divisions F, B, D, A, and E (which is the standard order), the macroblocks are read out in the order B, D, A, E, and F. As a result, if data which has been recorded on a magnetic tape in this scrambled condition is reproduced according to the standard manner, then the various areas of the screen are changed in position as illustrated in FIG. 3.

FIGS. 4A and 4B show another example in which scrambling is performed by changing the order in which shuffled macroblocks are read out. In particular, FIG. 4A indicates that the normal cycle of reading out the 1,350 macroblocks in each frame is displaced by half the frame (5×27×5 macroblocks, or 5×5 super-blocks), thereby producing a screen display that is displaced in the vertical direction by one-half, as shown in FIG. 4B. Alternatively, it should be understood that the reading out of the macroblocks may be displaced by a number of macroblocks equal to 5×27×M, to produce a displacement of the reproduced and displayed signal by M super-blocks in the vertical direction. In addition, if the macroblocks are read out with a displacement of 5×N macroblocks, where N is an integer that is not a multiple of 27, then the reproduced image undergoes a high degree of scrambling.

According to the techniques described up to this point, a control signal output from the controller 19 (FIG. 11) to the shuffling circuit 21 (as indicated by a solid line arrow) causes the shuffling circuit 21 to change the order in which DCT blocks are read out in order to perform scrambling, such that either the positions of the DCT blocks within a macroblock are rearranged, or the order in which the macroblocks are read out in each buffering unit is changed, or the entire reading cycle is displaced within the frame. As still other examples of scrambling techniques, there will now be described, with reference to FIGS. 5–7, techniques whereby scrambling is performed by changing the values of DCT coefficients after DCT processing is carried out in the DCT processing circuit 22.

According to one of these techniques, data bits corresponding to one or more of the 64 DCT coefficients are interchanged with each other to perform scrambling. In particular, in the example shown in FIG. 5, of the nine bits used to represent the DC component in each block of coefficient data, the first through fourth bits are interchanged, respectively, with the ninth, eight, seventh and sixth bits in order to carry out scrambling. Alternatively, it should be understood that such interchange of bits for a particular component can be carried out with respect to AC components, and, also, other ways of interchanging bits can be performed such as, for example, simply reversing the order of the first through fourth bits. Other variations in this technique can also be applied, as will be readily recognized.

According to another scrambling technique, for example, the values of the bits making up certain of the 64 DCT coefficients can be inverted (that is, by changing "0" to "1" and vice versa) to perform scrambling. As a specific example of this technique, FIG. 6 illustrates scrambling of the DC component by changing each bit thereof to its complement, where the value of the nth bit is represented in the figure as "an" and the inverted bit value is represented by the same symbol with an underscore. It should be understood that, instead of inverting the values of all of the bits, as shown in FIG. 6, it is also possible to invert only certain ones of the bits, such as the five least significant bits. In addition, it should be noted that one or more predetermined AC components may be selected for inversion instead of the DC component, and, as in the previous type of technique, a number of other variations are possible.

Figure 7:
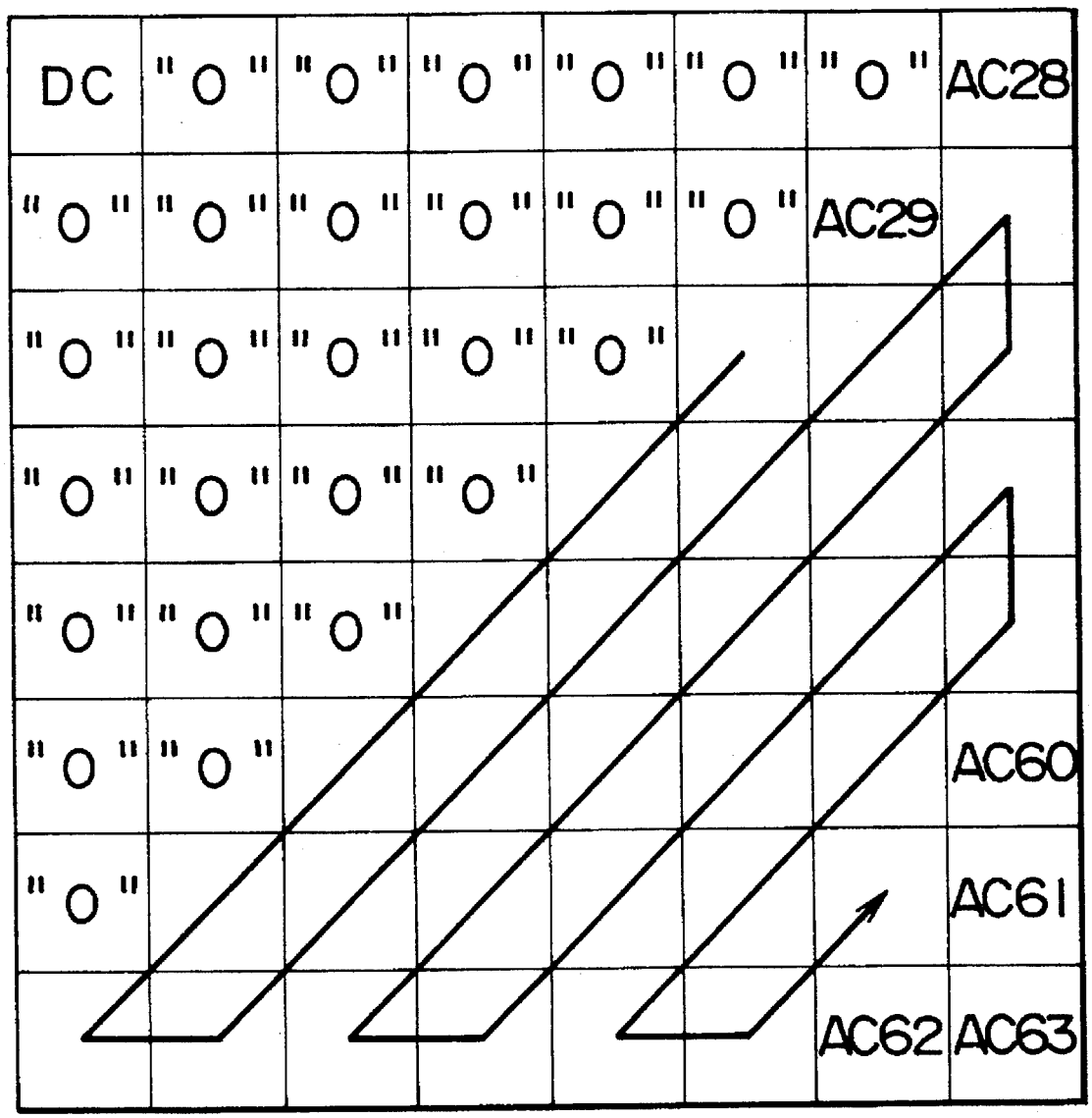
FIG. 7 is a schematic illustration of a method of scrambling a digital video signal in accordance with the present invention by setting to "0" the values of certain AC components of DCT-processed video data.

According to another technique, scrambling is performed by setting the values of certain ones of the 64 DCT coefficients to a fixed value. For example, as shown in FIG. 7, the values of the components AC1–AC27 are all set to "0". It should be understood that the values of DC components can be replaced with a fixed value in addition to or instead of replacing the values of the AC components with a fixed value, and that the selection of the components to be set to a fixed value is a matter of design choice. Also, although the example shown in FIG. 7 calls for the values of all of the bits of the components AC1–AC27 to be replaced with "0", as an alternative, fewer than all of the bits can be replaced, so that, for example, only certain predetermined bits of the particular components, such as the five least significant bits, may be replaced with a fixed value.

It should be understood that scrambling of the type illustrated in FIGS. 5–7 is carried out in response to a control signal provided from the controller 19 to the DCT processing circuit 22, as indicated by a dotted line arrow in FIG. 11.

Incidentally, if data scrambled according to the technique which entails replacing bits with a predetermined fixed value is recorded on a magnetic tape (as in FIG. 7), it is not possible to reverse the scrambling so as to recover the original data and accurately reproduce the original image. However, the scrambling techniques illustrated in FIGS. 1–6, which do not entail setting bits to a fixed value, are reversible so that it is possible to reverse the scrambling and to accurately reproduce the original image when copying is permitted by consent of the copyright holder and so forth. In this case, if a method is used for scrambling the audio signal which also permits descrambling, then both the image and the sound can be accurately reproduced in order to provide a complete television signal.

It is to be noted that some of the scrambling methods described above do not render the original image completely unrecognizable, but rather only partially scramble the image, so that the image can be more or less recognized. Such partial or "soft" scrambling can be applied, for example, so that the viewer may observe the content of the signal and may become interested in, for example, acquiring a tape having the signal recorded thereon, paying for a subscription broadcast service or the like.

Although various scrambling techniques have been described above, these techniques are merely illustrative, and other scrambling techniques, in accordance with a number of variations, may be adopted without departing from the scope of the present invention. Also, the particular ID signal described herein is one of a number of possible formats, and the present invention is not limited in this regard. In short, having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims. It should also be understood that setting bits to a predetermined value, as stated in the appended claims, includes inverting the respective values of the bits according to a predetermined scheme.

What is claimed is:

1. In a method of recording a digital video signal with compression-encoding that includes dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks, the improvement comprising the step of scrambling said digital video signal by interchanging at least some bits of a particular component of said discrete cosine transform processed data.

2. In a method of recording a digital video signal with compression-encoding that includes dividing each frame of said digital video signal into rectangular blocks of data, forming macroblocks from said rectangular blocks of data by aggregating a predetermined number of said block of data to form each of said macroblocks, shuffling positions of said macroblocks within said frame of the digital video signal, and performing discrete cosine transform processing block-by-block on said rectangular blocks of data making up said shuffled macroblocks, the improvement comprising the step of scrambling said digital video signal by setting to a predetermined value at least some bits of a particular component of said discrete cosine transform processed data.

3. A video signal scrambling apparatus comprising:

an analog-to-digital converter for converting an input analog video signal into a digital video signal;

a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks, to form compression-encoded data;

a signal decoder for decoding copy protection information that is included in said input analog video signal and is indicative of whether copying of said input analog video signal is permitted; and control means responsive to said signal decoder for controlling said compression coding circuit in accordance with said decoded copy protection information so that, if copying of said analog video signal is not permitted, said compression coding circuit interchanges at least some bits of a particular component of said discrete cosine transform processed data, 4. A video signal scrambling apparatus according to claim 3, wherein said signal decoder decodes said copy protection information included in said input analog video signal after said input analog video signal is converted into said digital video signal by said analog-to-digital converter.

5. A video signal scrambling apparatus comprising:

an analog-to-digital converter for converting an input analog video signal into a digital video signal;

a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;

a signal decoder for decoding copy protection information that is included in said input analog video signal and is indicative of whether copying of said input analog video signal is permitted; and control means responsive to said signal decoder for controlling said compression coding circuit in accordance with said decoded copy protection information so that, if copying of said analog video signal is not permitted, said compression coding circuit sets to a predetermined value at least some bits of a particular component of said discrete cosine transform processed data.

6. A video signal scrambling apparatus according to claim 5, wherein said signal decoder decodes said copy protection information included in said input analog video signal after said input analog video signal is converted into said digital video signal by said analog-to-digital converter.

7. A video signal scrambling circuit according to claim 5, wherein said signal decoder decodes said copy protection information included in said input analog video signal after said input analog video signal is converted into said digital video signal by said analog-to-digital converter.

8. A video signal scrambling circuit comprising:

an analog-to-digital converter for converting an input analog video signal into a digital video signal;

a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;

a signal decoder for decoding copy protection information that is included in said input analog video signal and is indicative of whether copying of said input analog video signal is permitted; and control means responsive to said signal decoder for controlling said compression coding circuit in accordance with said decoded copyright protection information so that, if copying of said analog video signal is not permitted, said compression coding circuit interchanges at least some bits of a particular component of said discrete cosine transform processed data.

9. A video signal scrambling circuit according to claim 3, wherein said signal decoder decodes said copy protection information included in said input analog video signal after said input analog video signal is converted into said digital video signal by said analog-to-digital converter.

10. A video signal scrambling circuit comprising:

an analog-to-digital converter for converting an input analog video signal into a digital video signal;

a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;

a signal decoder for decoding copy protection information that is included in said input analog video signal and is indicative of whether copying of said input analog video signal is permitted; and control means responsive to said signal decoder for controlling said compression coding circuit in accordance with said decoded copy protection information so that, if copying of said analog video signal is not permitted, said compression coding circuit sets to a predetermined value at least some bits of a particular component of said discrete cosine transform processed data.

11. A video signal scrambling circuit according to claim 5, wherein said signal decoder decodes said copy protection information included in said input analog video signal after said input analog video signal is converted into said digital video signal by said analog-to-digital converter.

12. In an apparatus for compression-encoding a digital video signal, the apparatus including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks, the improvement comprising means for scrambling said digital video signal by interchanging at least some bits of a particular component of said discrete cosine transform processed data.

13. In an apparatus for compression-encoding a digital video signal, the apparatus including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks, the improvement comprising means for scrambling said digital video signal by setting to a predetermined value at least some bits of a particular component of said discrete cosine transform processed data.

14. In a method of recording a digital video signal with compression-encoding that includes dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks, the improvement comprising the step of scrambling said digital video signal by interchanging at least some bits of a particular component of said discrete cosine transform processed data.

15. In a method of recording a digital video signal with compression-encoding that includes dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks, the improvement comprising the step of scrambling said digital video signal by setting to a predetermined value at least some bits of a particular component of said discrete cosine transform processed data.

16. A video signal scrambling apparatus comprising:
   an analog-to-digital converter for converting an input analog video signal into a digital video signal;
   a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;
   a signal decoder for decoding copy protection information that is included in said input analog video signal and is indicative of whether copying of said input analog video signal is permitted; and
   control means responsive to said signal decoder for controlling said compression coding circuit in accordance with said decoded copyright protection information so that the rectangular blocks of data making up each macroblock are arranged according to a standard pattern within said macroblock if copying of said input analog video signal is permitted, and for controlling said compression coding circuit to interchange at least some bits of a particular component of said discrete cosine transform processed data if copying of said input analog video signal is not permitted.

17. A video signal scrambling apparatus comprising:
   an analog-to-digital converter for converting an input analog video signal into a digital video signal;
   a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;
   a signal decoder for decoding copy protection information that is included in said input analog video signal and is indicative of whether copying of said input analog video signal is permitted; and
   control means responsive to said signal decoder for controlling said compression coding circuit in accordance with said decoded copyright protection information so that the rectangular blocks of data making up each macroblock are arranged according to a standard pattern within said macroblock if copying of said input analog video signal is permitted, and for controlling said compression coding circuit to set to a predetermined value at least some bits of a particular component of said discrete cosine transform processed data if copying of said input analog video signal is not permitted.

18. A video signal scrambling circuit comprising:
   an analog-to-digital converter for converting an input analog video signal into a digital video signal;
   a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;
   a signal decoder for decoding copy protection information that is included in said input analog video signal and is indicative of whether copying of said input analog video signal is permitted; and
   control means responsive to said signal decoder for controlling said compression coding circuit in accordance with said decoded copyright protection information so that the rectangular blocks of data making up each macroblock are arranged according to a standard pattern within said macroblock if copying of said input analog video signal is permitted, and for controlling said compression coding circuit to interchange at least some bits of a particular component of said discrete cosine transform processed data if copying of said input analog video signal is not permitted.

19. A video signal scrambling circuit comprising:
   an analog-to-digital converter for converting an input analog video signal into a digital video signal;
   a compression coding circuit including means for dividing each frame of said digital video signal into rectangular blocks of data, forming macroblocks from said rectangular blocks of data by aggregating a predetermined number of said blocks of data to form each of said macroblocks, shuffling positions of said macroblocks within said frame of the digital video signal, and performing discrete cosine transform processing block-by-block on said rectangular blocks of data making up said shuffled macroblocks to form compression-encoded data;
   a signal decoder for decoding copy protection information that is included in said input analog video signal and is indicative of whether copying of said input analog video signal is permitted; and
   control means responsive to said signal decoder for controlling said compression coding circuit in accordance with said decoded copyright protection information so that the rectangular blocks of data making up each macroblock are arranged according to a standard pattern within said macroblock if copying of said input analog video signal is permitted, and for controlling said compression coding circuit to set to a predetermined value at least some bits of a particular component of said discrete cosine transform processed data if copying of said input analog video signal is not permitted.

* * * * *